United States Patent [19]
Herpich et al.

[11] 3,746,192
[45] July 17, 1973

[54] TAILGATE FOR A REAR LOADER REFUSE VEHICLE

[75] Inventors: William A. Herpich; Donal W. Chaney, both of Galion, Ohio; George W. Palmer, Durant, Okla.

[73] Assignee: Peabody Galion Corporation, Galion, Ohio

[22] Filed: July 23, 1971

[21] Appl. No.: 165,517

[52] U.S. Cl. ............................................... 214/83.3
[51] Int. Cl. .............................................. B65f 3/00
[58] Field of Search ........................... 214/503, 83.3

[56] References Cited
UNITED STATES PATENTS

| | | | |
|---|---|---|---|
| 3,348,708 | 10/1967 | Gollnick | 214/83.3 |
| 3,615,029 | 10/1971 | Anderson | 214/83.3 |
| 3,653,522 | 4/1972 | Gollnick | 214/83.3 |
| 3,661,281 | 5/1972 | Herpich et al. | 214/83.3 |

Primary Examiner—Albert J. Makay
Attorney—Owen & Owen

[57] ABSTRACT

A tailgate for a rear loader refuse truck. The tailgate has parallel vertical side walls and a hopper bottom. The hopper bottom has a generally V-shaped longitudinal section. There are a pair of parallel, straight, downwardly and rearwardly inclined guide tracks, one in the upper forward part of each side wall. A generally L-shaped packer blade is pivoted at the upper end of the upright bar of the L on a cross rod carried by slides which are movable along the guide tracks by power means. A pair of extensible cylinders are pivotally connected at the upper rear corners of the side walls and to the packer blade at points near the angle of the L. The packer blade is cycled by retracting the rear cylinders, moving the slide down the guides, extending the rear cylinders and then moving the slides up the guides, to pass backwardly over refuse in the hopper, to come down behind the refuse and to sweep it forwardly along the hopper bottom and upwardly into the truck body.

4 Claims, 8 Drawing Figures

Patented July 17, 1973
3,746,192
3 Sheets-Sheet 1
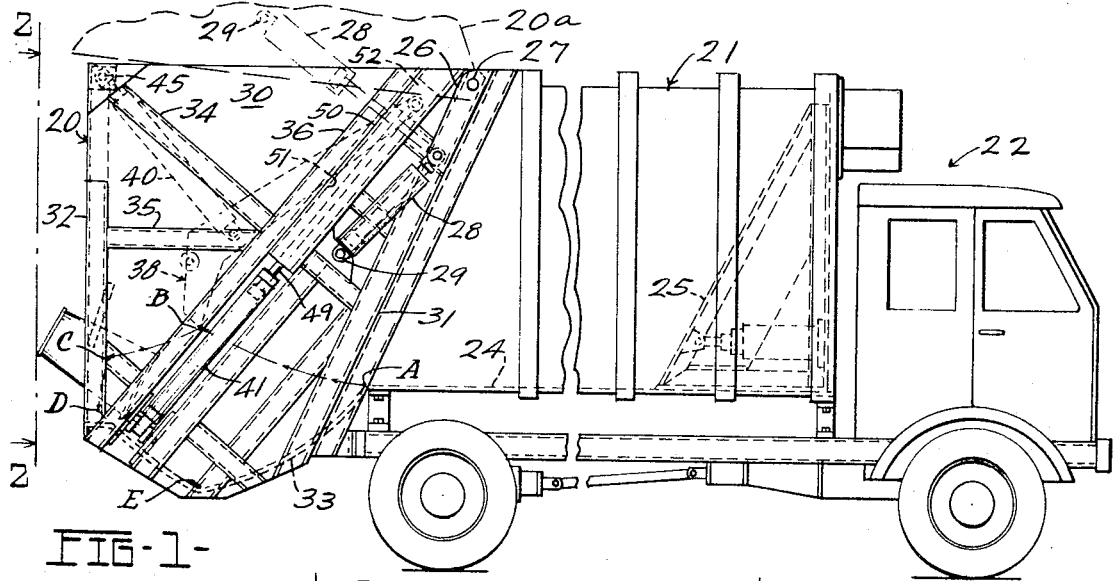
FIG-1-
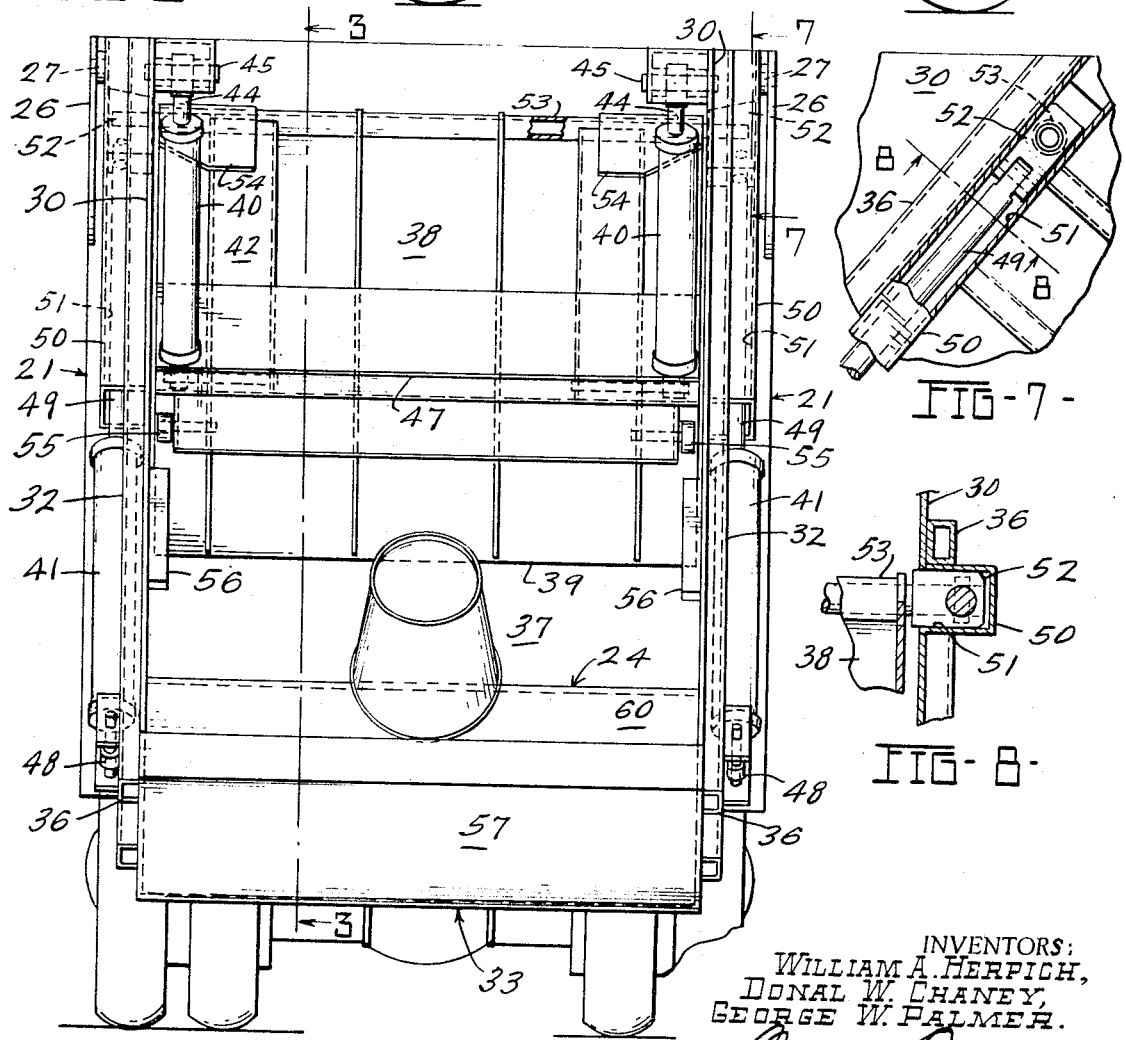
FIG-2-
FIG-7-
FIG-8-
INVENTORS:
WILLIAM A. HERPICH,
DONAL W. CHANEY,
GEORGE W. PALMER.
BY Owen + Owen
ATTYS.

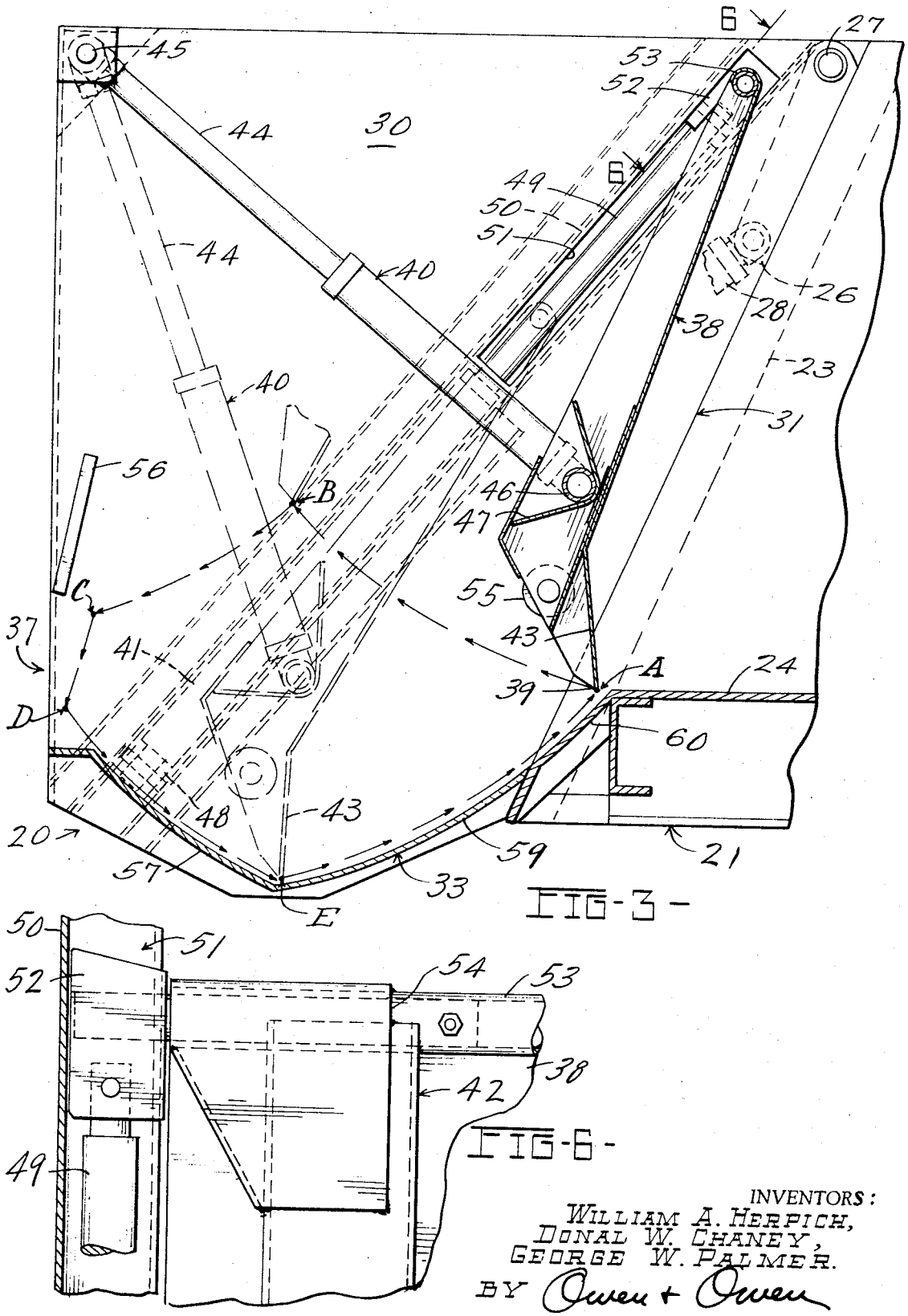

Patented July 17, 1973
3,746,192
3 Sheets-Sheet 3
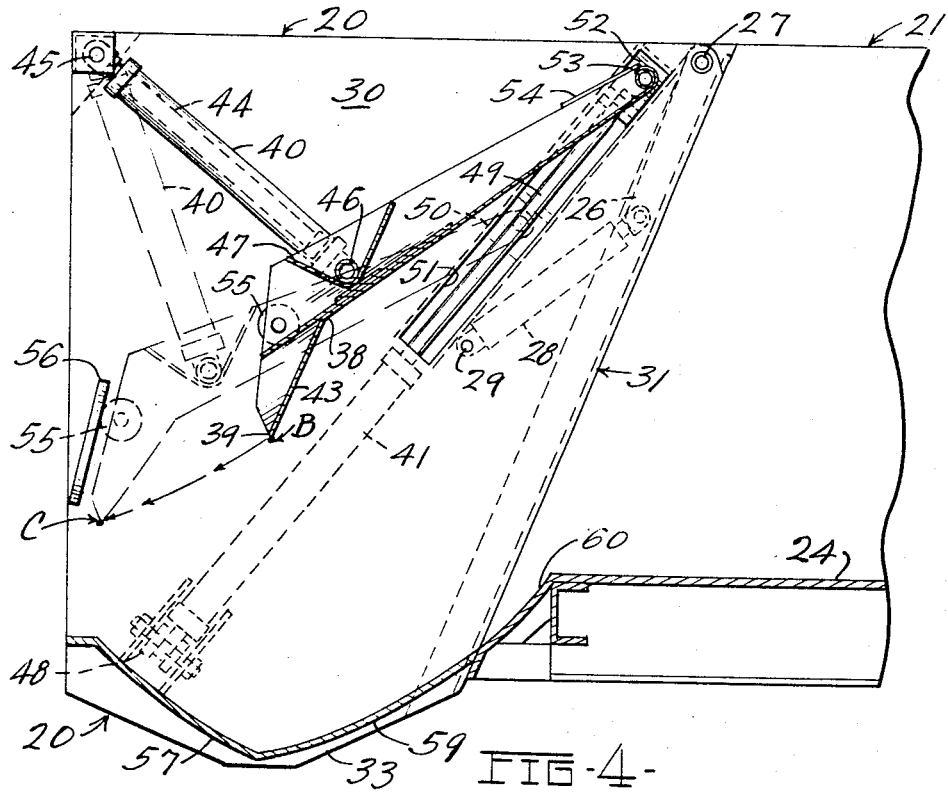
FIG-4-
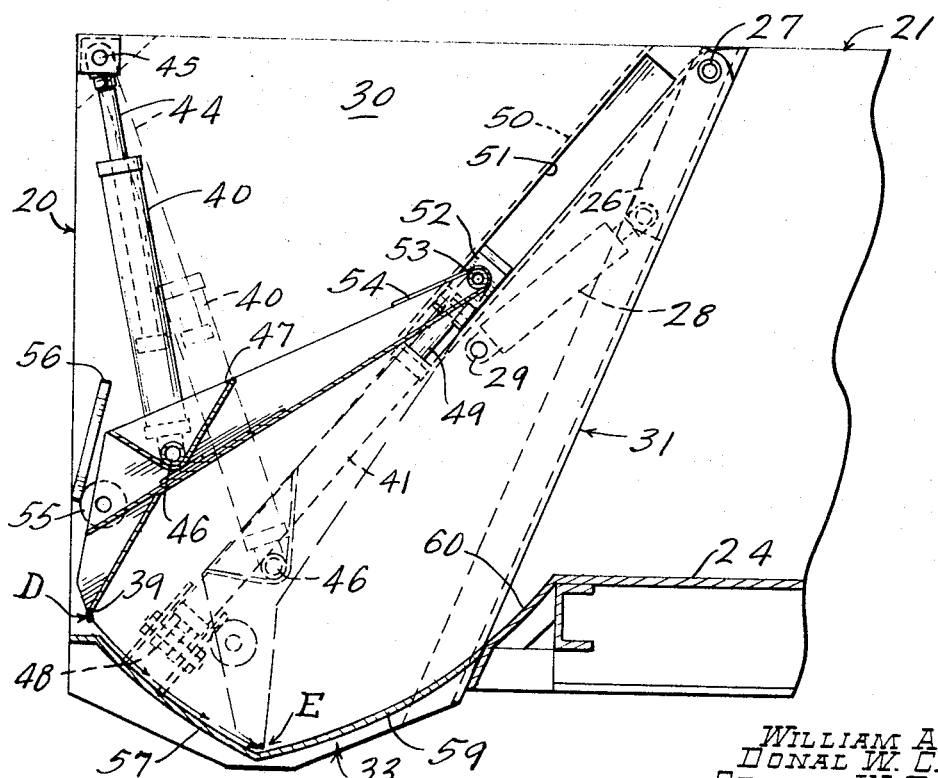
FIG-5-
INVENTORS:
WILLIAM A. HERPICH,
DONAL W. CHANEY,
GEORGE W. PALMER.
BY Owen + Owen
ATT'YS.

TAILGATE FOR A REAR LOADER REFUSE VEHICLE

BACKGROUND OF THE INVENTION

A tailgate according to the invention is designed for use on a refuse vehicle which has an open rear end. The tailgate comprises mechanism for packing refuse into the vehicle body. Workers empty refuse cans through a rear loading opening into a hopper in the bottom of the tailgate. When a sufficient number of refuse containers have been emptied into the hopper, hydraulic mechanisms are actuated to sweep a packer blade through the hopper to move the refuse forwardly and into the open body of the refuse vehicle. After the body has been filled, the truck is driven to a disposal center. The tailgate is swung open and the refuse emptied from the body, either by tilting the body for dumping or by an ejector plate.

Several primary criteria are important in the design of such a tailgate. These are:

1. That the bottom side of the loading opening at the rear of the tailgate be at a relatively low level compared to the street level to minimize the distance which operators have to lift refuse cans.

2. That the refuse hopper have as large a capacity as possible within the maximum dimensions of the tailgate which are permissible so as to allow as many refuse containers as possible to be dumped into the hopper between cycles of the packer blade.

3. That the packer blade be actuated by means, usually hydraulic, having good mechanical advantage so that adequate power may be applied to the packer blade for moving the refuse out of the hopper, for crushing or breaking many objects usually encountered in refuse, which would interfere with the packing operation.

4. That the packer blade have a cycle of operations which insures that it passes backwardly over the refuse in the hopper at the beginning of its cycle in order to avoid sweeping any of the refuse out of the rear loading opening of the tailgate during the cycle.

5. That the packer blade operating mechanism be responsive to jams. For example, if an object such as a bedspring or a massive timber were inserted part way into the loading opening of the tailgate, the packer blade would not be able to break or cut this object and the cycle would jam. Under such circumstances, the packer blade operating mechanism should respond to the jam by either elevating the packer blade to relieve the jam or by moving it forwardly away from the object which is jamming its action.

It is therefore the principal object of the instant invention to provide a tailgate for a rear loader refuse vehicle in which the packer blade is actuated by hydraulic cylinder means or the like for movement through a cycle wherein it travels backwardly above the level of refuse in the loading hopper, downwardly behind the refuse and forwardly to move the refuse into the open rear end of the truck itself, the movement of the packer blade being responsive to jammed conditions in order to alleviate such conditions automatically.

BRIEF DESCRIPTION OF THE DRAWINGS

FIG. 1 is a side view in elevation, partly broken away, and generally illustrating a tailgate embodying the invention as mounted on the rear of a refuse truck;

FIG. 2 is an end view in elevation taken from the position indicated by the line 2—2 of FIG. 1 and shown on an enlarged scale;

FIG. 3 is a fragmentary somewhat diagrammatic view in vertical, longitudinal section taken generally along the line 3—3 of FIG. 2 and shown on a further enlarged scale;

FIG. 4 is a view similar to FIG. 3, but shown on a smaller scale, and illustrating the position of the packer blade and its actuating mechanism midway in the rearward leg of its operating path;

FIG. 5 is a view similar to FIG. 4 but illustrating the mechanism during that portion of its path commencing at the rear and moving downwardly toward the bottom of the refuse loading hopper and en route to the forward position illustrated in FIG. 3;

FIG. 6 is a fragmentary view, partly in section and partly in elevation, taken along the line 6—6 of FIG. 3;

FIG. 7 is a fragmentary view, part in section and part in elevation, taken from the position indicated by the line 7—7 of FIG. 2; and FIG. 8 is a fragmentary, detailed sectional view taken along the line 8—8 of FIG. 7.

DESCRIPTION OF PREFERRED EMBODIMENT

A tailgate embodying the invention is generally indicated by the reference number 20 and is illustrated in FIG. 1 as being mounted on the rear of a body 21 of a refuse truck generally indicated by the reference number 22. The body 21 has an open, generally rectangular rear end defined by a perimeter frame 23, which rear end is inclined from top to bottom in a rearward direction. The body has a floor 24 and an interior, hydraulically actuated ejector plate 25. The tailgate 20 is pivotally connected to the body 21 by massive ears 26 and pivot pins 27 so that it can be swung upwardly and rearwardly to the position fragmentarily illustrated in dotted lines in FIG. 1, and indicated by the reference number 20a, by the action of a pair of elevating cylinders 28, one at each side of the body 21 and pivotally connected to the ears 26 and by massive pivot pins 29 to side walls 30 of the tailgate 20.

The side walls 30 are laterally spaced from each other and extend between a perimeter frame 31 at the front of the tailgate 20 and rear frame uprights 32 at the rear of the tailgate 20. The frame 31 and frame uprights 32 also mount a hopper bottom 33 which extends across the bottom of the tailgate 20 and a top (not shown) may also be erected to close off the top of the tailgate 20, being secured to the side walls 30, the frame 31 and the uprights 32. The entire tailgate structure is adequately braced and strengthened by suitable side wall frame members such as the illustrated channels 34, 35 and 36. The side walls 30 and the top and rear edge of the hopper bottom 33 define between them a loading opening generally indicated by the reference number 37 at the rear of the tailgate 20 through which refuse containers and the like may be emptied as shown in FIGS. 1 and 2.

A heavy packer blade, generally indicated by the reference number 38, is mounted interiorly of the tailgate 20 extending across the tailgate 20 and movable through a cycle with its lower edge 39 traversing a path illustrated in FIG. 3 as consisting of five legs between the letters, thusly: A–B, B–C, C–D, D–E, and E–A. Movement of the packer blade 38 and, particularly, its lower edge 39 through the path just identified is effected by the sequential actuation of two pairs of cylinders 40 and 41. In the arrangement illustrated in the drawing, the packer blade 38 has two arms, an upper arm 42 and a lower arm 43, with its lower edge 39 being defined by the lower end of the lower arm 43. The arms 42 and 43 are assembled in a generally L-shaped longitudinal configuration, with the upper arm 42 extending downwardly and rearwardly and the lower arm 43 extending forwardly from the apex of the L.

Pistons 44 of the power cylinders 40 are pivotally mounted to heavy pivot pins 45 mounted at the upper rear corners of the side walls 30. The lower ends of the cylinders 40 are pivotally attached to stub pins 46 (see FIG. 3 particularly) which are welded or otherwise rigidly mounted in a trough 47 extending transversely across the packer blade 38 and forming a part of its structure. The point of attachment of the ends of the cylinders 40 to the stub pins 46 lies in the upper arm 42 of the packer blade 38 but near the apex of the L defined by the arms 42 and 43.

The power cylinders 41 are mounted, one on each outer side of its respective sidewall 30, by clevises 48 located near the lower rear corners of the side walls 30 and supported by rigid cross members, (not shown). The power cylinders 41 extend upwardly and forwardly toward the upper front corners of the side walls 30 and their rods 49 extend longitudinally into the open lower ends of U-shaped track covers 50. The track covers 50 overlie elongated track slots 51 formed in the side walls 30 by channels 36.

The upper end of each of the rods 49 is pivotally connected to a slide block 52 which is adapted to reciprocate in the interior of the track cover 50 upon extension and retraction of its rod 49. The slide blocks 52 carry a cross member 53 (see FIG. 6) which is rigidly connected by gusset plates 54 to the upper corners of the packer blade arm 42. Thus extension and retraction of the power cylinders 41 and their rods 49 results in sliding the blocks 52 back and forth in the track slots 51.

Retraction and extension of the cylinders 40 and their rods 44 swings the packer blade 38 angularly around the pivot point provided by the cross member 53.

Movement of the bottom edge 39 of the packer blade 38 from Position A (FIG. 3) to Position B (FIG. 4) along the curved leg A–B, is effected by retracting the rod 44 of the cylinder 40 to swing the packer blade 38 backwardly and upwardly. The leg A–B is thus an arcuate path drawn around the center of the cross member 53. Movement of the lower edge 39 of the packer blade 38 from Position B to Position C, along the curved leg B–C is effected by retracting the rods 49 of the cylinders 41 until rollers 55 (see FIG. 4) mounted at each side of the packer blade 38 strike a pair of guide bars 56 one of which is mounted at each side of the tailgate 20 on the respective side wall 30.

The guide bars 56 function to guide the movement of the lower edge 39 of the packer blade 38 along a straight leg C–D downwardly across the loading opening 37. This movement is effected by continued retraction of the piston rods 49 and simultaneous slight extension of the piston rods 44 from their fully retracted positions as illustrated in FIG. 4. In moving from Position B to Position C, the power cylinders 41 retract their rods 49 until the rollers 55 strike the guide bars 56. This increases the resistance to movement and automatically switches valving to admit power oil to the now retracted cylinders 40 to extend their rods 44 slightly as the cylinders 41 continue to retract. The cylinders 40 continue to extend their rods 44 to full extended position until the lower edge 39 of the packer blade 38 reaches Position D. This simultaneous action of continued retraction of the cylinders 41 and extension of the cylinders 40, results in pushing the packer blade edge 39 downwardly along the leg C–D, being guided by the rollers 55 in contact with the guide bars 56. This movement is seen by comparing FIGS. 4 and 5.

Upon reaching Position D, the cylinders 41 have fully retracted their rods 49 and the continued feeding of power fluid to the cylinders 40 results in further extending the rods 44 to move the lower edge 39 of the packer blade from Position D as illustrated in FIG. 5 to Position E as illustrated in broken lines in both FIGS. 3 and 5.

The leg D–E is arcuate, representing the movement of the lower edge 39 of the packer blade 38 around the center provided by the cross member 53. A portion 57 of the hopper bottom 33 is cylindrical in shape and extends downwardly and forwardly from a lower lip 58 which defines the bottom of the loading opening 37. The hopper portion 57 may be considered to be one arm of a generally V-shaped bottom in longitudinal section.

Further movement of the lower edge 39 of the packer blade 38 from Position E to Position A, along the leg E–A (see FIG. 3) is effected by extending the cylinders 41 to move slide blocks 52 along the track 51 from their lowermost position (FIG. 5) to their uppermost position (FIG. 3) while maintaining the cylinders 40 in fully extended position. The leg E–A is not arcuate around the center provided by the cross bar 45 because, although the cylinders 40 swing around that center, the upper end of the packer blade 38 as carried by the slide blocks 52 is moving upwardly along the track 51. The shape of a forward hopper portion 59 is defined by the leg E–A through which the lower edge 39 of the packer blade 38 is moved during this portion of its cycle.

As can best be seen by reference to FIG. 3, this forward portion 59 of the hopper bottom 33 constitutes a second arm of the generally V-shaped hopper bottom 33 and blends into a downwardly directed body apron 60 which leads upwardly to the level of the body floor 24. Extension of the cylinders 41 to the bottom edge 39 along the leg E–A is effected by the resulting hydraulic pressures in the control system which occur when the cylinders 40 reach their fully extended position at E (dotted lines FIG. 3 and FIG. 5).

In the event that some heavy, non-frangible item is partially inserted through the loading opening 37 so that it extends into the hopper 33, resting on the lower lip 58 and protruding outwardly therefrom, when the packer blade 38 is moved from Position C downwardly to Position D, its bottom edge 39 will strike such object. If the object cannot be broken by the power applied thereto, the resulting sharp increase in pressure in the cylinders 44 which are extending during this movement along the leg C–D, results in transferring the hydraulic pressure to the cylinders 41 which immediately extend their piston rods 49 to "pick up" the packer blade 38 and move it forwardly above the refuse in the hopper 33. This releases the item jammed between the lower edge 39 and the lip 58 defining the bottom of the loading opening 37. The operator is signalled that the cycle has not been properly completed and he may remove the object which has caused the jam.

When a sufficient number of loads of refuse have been emptied into the hopper 33 and fed forwardly therefrom into the body 21, so that the refuse in the body 21 presents sufficient resistance to the forward movement of the packer blade 38 along the leg E–A, the packer blade 43 cannot reach Position A. This results in the cylinders 41 not being fully extended during this part of the cycle and the hydraulic pressure in their system reaches its maximum prior to the time the blade reaches its forward, body-closing Position A. This results in an indication to the operator that the body 21 is filled and no further refuse can be accumulated therein.

Having described our invention we claim:

1. A tailgate for loading refuse into the open rear end of a generally rectangular refuse vehicle body,
   said tailgate comprising, a rectangular frame mating with such open rear end of said vehicle body,
   parallel vertical side walls extending rearwardly from said frame,
   a hopper bottom extending across between said side walls,
   the rear edges of said side walls and said bottom defining a loading opening into said tailgate,
   a generally rectangular packer blade extending across said tailgate between said side walls,
   an inclined linear guide track comprising a linear slot in each of said side walls extending upwardly toward said rectangular frame,
   a cross member extending across the front upper end of said packer blade and outwardly through said slots,
   a rectangular slide block on each end of said cross member that is reciprocal in the respective one of said guide tracks,
   each of said guide tracks also comprising an elongated three-sided guide overlying the respective one of said slots in said side walls and consisting of upper and lower parallel sides closely embracing upper and lower surfaces of said slide block and an outer side closely engaging the outer side of said slide block, whereby said slide block is slidingly engaged with all three of said sides of said guide,
   first extensible power cylinder means mounted on the outer sides of said side walls and connected at their upper ends to the lower ends of said slide blocks and at their lower ends to the rear lower portions of said side walls in co-linear alignment with said guide tracks,
   whereby the force applied by said first extensible power cylinder means is directed along the co-linear path defined by said guide tracks and said extensible power cylinders, and
   a second pair of power cylinders pivotally mounted at one end adjacent the upper rear corners of said side walls and pivotally connected to said packer blade at a point between the upper and lower ends thereof,
   said first extensible power cylinder means and said second power cylinders being sequentially energized for cycling said packer blade through a packing cycle.

2. A tailgate according to claim 1 in which the hopper bottom has a shallow, generally V-shaped longitudinal section, the rear portion thereof extending forwardly and downwardly from the bottom edge of the open rear end of said tailgate and the front portion thereof extending upwardly and forwardly to the rear floor level of said refuse vehicle.

3. In a tailgate according to claim 1, the improvement comprising downwardly extending parallel guide bars mounted near the rear edges of the side walls and a roller mounted on each side of the shorter arm of the packer blade, said rollers engaging said guide bars near the end of the movement of the upper end of said packer blade downwardly along the path for guiding the lower edge of said packer blade across the lower reaches of the open rear end of said tailgate.

4. A tailgate according to claim 1 and pivot means connecting the upper forward corners of the side walls to the upper rear corners of the refuse vehicle body and power means for swinging said tailgate between a lowered loading position and a raised discharge position.

* * * * *